(12) United States Patent
Shen et al.

(10) Patent No.: US 10,572,405 B1
(45) Date of Patent: Feb. 25, 2020

(54) WRITING MESSAGES IN A SHARED MEMORY ARCHITECTURE FOR A VEHICLE

(71) Applicant: DiDi Research America, LLC, Mountain View, CA (US)

(72) Inventors: Yuzhu Shen, Santa Clara, CA (US); Alok Priyadarshi, Mountain View, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/236,182

(22) Filed: Dec. 28, 2018

(51) Int. Cl.
*G06F 13/16* (2006.01)
*B60R 16/023* (2006.01)

(52) U.S. Cl.
CPC ...... *G06F 13/1673* (2013.01); *B60R 16/0231* (2013.01)

(58) Field of Classification Search
None
See application file for complete search history.

(56) References Cited

U.S. PATENT DOCUMENTS

| 7,802,071 | B2 * | 9/2010 | Oved | G06F 13/28 711/170 |
| 10,353,757 | B2 * | 7/2019 | Martin | G06F 21/606 |
| 2004/0034664 | A1 | 2/2004 | Jain et al. | |
| 2005/0226201 | A1 * | 10/2005 | McMillin | H04L 45/00 370/348 |
| 2008/0168122 | A1 | 7/2008 | Fletcher et al. | |
| 2009/0089487 | A1 * | 4/2009 | Kwon | G06F 12/0851 711/103 |
| 2015/0288636 | A1 | 10/2015 | Yalavarty et al. | |
| 2016/0080491 | A1 | 3/2016 | Sykes et al. | |
| 2017/0262172 | A1 | 9/2017 | Xu et al. | |
| 2017/0353418 | A1 | 12/2017 | Feng et al. | |
| 2018/0183873 | A1 | 6/2018 | Wang et al. | |
| 2018/0314934 | A1 * | 11/2018 | Ben-Avi | G06N 3/063 |

OTHER PUBLICATIONS

International Search Report and Written Opinion in International Application No. PCT/US2018/068038, Notification dated Mar. 29, 2019.

* cited by examiner

*Primary Examiner* — Michael Sun
(74) *Attorney, Agent, or Firm* — Knobbe Martens Olson & Bear LLP

(57) ABSTRACT

A method of communicating messages between a plurality of modules in a system on a vehicle, each module of the plurality of modules implemented on at least one processor and configured as a publisher node and/or a subscriber node and collectively forming a plurality of nodes that communicate in the operation of the vehicle. The method may include generating a first message associated with a first topic by a first publisher node, writing, by the first publisher node, the first message in a memory location in a first message buffer of the plurality of message buffers, the first message buffer associated with the first topic and configured to store a plurality of messages associated with the first topic, and writing in a registry information associated with writing the first message, the registry configured to store location information of the first message.

17 Claims, 10 Drawing Sheets

WRITING MESSAGES IN A SHARED MEMORY ARCHITECTURE FOR A VEHICLE

BACKGROUND

Field

This disclosure generally relates to a message communication architecture, and, in particular, to a centralized communication architecture for a computer system in a vehicle.

Background

Vehicle software systems can be represented as a computation graph of nodes that communicate with each other by passing messages. Nodes are processes that perform computation for a subset of the vehicle computer system. There are dedicated nodes to perform localization, perception, planning, and control operations. For example, a sensor node relating to a light detection and ranging (LiDAR) system may collect and provide a LiDAR image as a sensor message. A perception node may receive the LiDAR image message and use the information to determine an aspect of the environment surrounding the vehicle based on the LiDAR image (e.g., distance of objects in front of the vehicle), and provide a perception message to related to the determined aspect. A controller node may receive the perception message and control the vehicle using information in the perception message to control the vehicle (e.g., to brake, or to continue to move the vehicle forward on its planned route).

Messages from individual nodes can be routed via an inter-process communication (IPC) system with publish and subscribe semantics. A node sends out a message by publishing it to a given topic. The topic is a name that is used to identify the content of the message published by the node. A node that is interested in a certain kind of data will subscribe to the appropriate topic. There may be multiple concurrent publishers and subscribers for a single topic, in a single node may publish and/or subscribe to multiple topics. In general, publisher nodes and subscriber nodes are not aware of each other's existence. The idea is to decouple the production of information from its consumption. Logically one can think of a topic is a strongly typed message bus. Each bus is a name, and anyone can connect to the bus to send or receive messages as long as they are of the right type.

A modular architecture provides stability even if a process crashes. For example, individual processes may intermittently crash and relaunch without shutting down the entire system. However, this modularity comes at a cost. The IPC system required for node communication introduces latency. Keeping the latency of messages low is critical for safe operations of an autonomous vehicle, a vehicle that provides driver-assist features, and/or a vehicle used for location-based services. A vehicle, such as an autonomous vehicle, a vehicle that provides driver-assist features, and/or a vehicle used for location-based services, in a busy environment is subject to numerous inputs often requiring immediate control actions for safety of the vehicle and for people and property near the vehicle. For example, the vehicle may receive a signal indicating a pedestrian or an oncoming vehicle is in its lane and must be able to read be able to react immediately.

In addition, there is unnecessary overhead for systems many subscribers to a topic. For each subscriber, a communication path must be established between the publisher and each of the subscribers. Each path requires kernel interaction. As numerous messages (e.g., thousands to millions and more) are communicated, the overhead processing in such a system impacts the computing resources. TCP/IP, the transport protocol is used by ROS has too much overhead due to routing, ACK, flow control, etc. In fact, any pipe-based IPC mechanism is a bad fit for real-time systems due to one or more of the following reasons: (1) pipes favor older data over newer data, and can block or drop your messages, which is the opposite of how real-time systems want to be operated; (2) messages are routed via the kernel which may introduce multiple context switches; (3) a message is copied at least two times (publisher-to-kernel and kernel-to-subscriber) for each publisher-subscriber pair, which inefficiency to each published and subscribe to message; (4) large messages need to be broken down into chunks and transferred in several iterations due to limited kernel memory; and (5) the overhead of a signaling mechanism is unnecessary since real-time systems typically run on a fixed timer.

SUMMARY

The systems, methods, and devices of the invention each have several aspects (features), no single aspect of which is solely responsible for its desirable attributes. Without limiting the scope of this invention as expressed by the claims which follow, some of the aspects are described below.

One innovation includes a system implemented on a vehicle, for example in an autonomous vehicle. In some embodiments, the system includes a shared memory message system for communication between modules in a computer system on a vehicle, the system includes a plurality of modules, each module configured to perform a function related to controlling a vehicle, each of the modules comprising an associated node configured as a publisher node to write a message for a topic related to its representative module or as a subscriber node to read a message for another topic written by another node, or both a publisher node to write a message for a topic related to its associated module and a subscriber node to read a message for another topic written by another node, the nodes of each of the plurality of modules defining a plurality of nodes for communicating messages between the plurality of modules. The system also includes a topic registry implemented on a data storage component, the topic registry configured to store information indicative of the storage location for a plurality of groups of messages, each group of messages related to a unique topic and each group of messages stored in a different message buffer and published by one of the plurality of nodes, a plurality of message buffers each in communication with the topic registry, each message buffer comprising a ring-buffer storage component configured to store messages published by one of the plurality of nodes, and a communication bus coupled to the topic registry, the plurality of message buffers, and the plurality of nodes. The communication bus is configured such that nodes can write messages directly to at least one of the message buffers and write location information indicative of the location of the written message in the topic registry, and such that nodes can read messages of a particular topic directly from at least one of the message buffers using information from the topic registry indicative of the location of the messages of a particular topic.

Embodiments of systems described herein may have one or more other aspects (features) in various embodiments of the system, a number of these aspects being noted here.

However, various embodiments of such systems may have additional aspects or fewer aspects, and the aspects disclosed herein can be used together in a number of embodiments even if specifically not illustrated or described as being in a certain embodiment, as one of ordinary skill in the art will appreciate. For example, in one aspect each node comprises at least one processor coupled to a memory component. In another aspect, the communication bus is configured such that subscriber nodes of the plurality of nodes can read messages directly from the message buffers without going through a kernel of the computer system. In another aspect, the communication bus is configured such that publisher nodes of the plurality of nodes can write messages directly to the message buffers without going through a kernel of the computer system.

In another aspect of such systems, the topic registry is configured to store information of the location of every message stored on any of the plurality of message buffers. In another aspect, the information stored by the topic registry for each message comprises data representative of the address of the message buffer that stores said each message. In another aspect, the information stored by the topic registry for each message comprises data representative of the topic of said each message. In another aspect, the information stored by the topic registry for each message comprises data representative of the published frequency of said each message. In another aspect, information stored by the topic registry for a message comprises the location of the start of said message in the message buffer that stores said message. In another aspect, the information stored by the topic registry for said message comprises the pending location, in the message buffer that stores the message, of the end of said message, while the message is being written.

In another aspect, of such systems, each of the plurality of message buffers stores messages related to a single topic. In another aspect, one message buffer, of the plurality of message buffers, stores all of the messages related to a single topic. In another aspect, each subscriber node writes messages related to a single topic. In another aspect, one or more of the subscriber modes reads messages related to more than one topic. In another aspect, each message buffer is configured to store a plurality of messages from a publisher node, each of the stored messages including information related to the message and a message content. In another aspect, the plurality of message buffers are configured to store messages from a publisher node of a predetermined size. In another aspect, the plurality of message buffers are configured to store messages from a publisher node of a dynamically determined size.

In another innovation, a shared memory message system for communication between modules configured to perform a function related to controlling a vehicle in a computer system on the vehicle. The system may include a plurality of modules each representative as a node, the plurality of modules collectively representative as a plurality of nodes, each node configured as a publisher node to write a message for a topic related to its representative module or as a subscriber node to read a message for another topic written by another node, or both. The system may also include a topic registry implemented on a data storage component configured to store information indicative of the storage location. The system may also include a plurality of message buffers each in communication with the topic registry, each message buffer implemented on a storage component configured to store messages published by one of the plurality of nodes. The system may further include a communication bus coupled to the topic registry, the plurality of message buffers, and the plurality of nodes, where the communication bus is configured such that publisher node messages are stored in a message buffer and associated storage location information is stored in the topic registry without going through a kernel of said computer system, and such that subscriber nodes can read messages directly from a message buffer using information from the topic registry without going through the kernel.

Another innovation includes a method of communicating messages between a plurality of modules in a system on a vehicle, each module of the plurality of modules configured as a publisher node that writes messages, a subscriber node that reads messages, or both a publisher node and a subscriber node, the publisher nodes and the subscriber nodes collectively forming a plurality of nodes that communicate in the operation of the vehicle. An example of such a method includes generating a plurality of groups of messages by publisher nodes of the plurality of nodes, each group of messages associated with a unique topic and generated by a single publisher node associated with the unique topic, writing, by the publisher nodes, each of the plurality of groups of messages in a memory location of a respective message buffer that is associated with the same topic as the group of messages, the respective message buffer being one of a plurality of message buffers, each of the plurality of message buffers associated with one message topic, writing in a registry, by each publisher node and for each message written in a message buffer, location information indicating where the message was written to, wherein the registry is configured to store location information associating each message written in a message buffer with an address of the message buffer, a memory location where each message written to a message buffer is stored, and a topic, reading, by subscriber nodes, new message information from the registry, the new message information indicative of whether a new message associated with a particular topic is available, each of the subscriber nodes configured to read one or more of the groups of messages, and determining, by each of the subscriber nodes, using the new message information read from the registry, if at least one new message associated with a topic that a respective subscriber node is also associated with is available. The method further includes in response to determining at least one new message is available, reading from the registry, by each of the respective subscriber nodes, the location information indicating where the at least one new message is stored, and reading, by each of the respective subscriber nodes, the at least one new message from the respective message buffer.

Embodiments of methods described herein may have one or more other aspects (features) in various embodiments of the system, a number of these aspects being noted here. However, various embodiments of such methods may have additional aspects or fewer aspects, and the aspects disclosed herein can be used together in an number of embodiments even if specifically not illustrated or described as being in a certain embodiment, as one of ordinary skill in the art will appreciate. For example, in one aspect writing in the registry comprises writing information in the registry indicative of a location in the message buffer where a message starts and a location in the message buffer where the message ends. In another aspect, writing in the registry further comprises writing information indicative of the location where the message ends before the writing of the message to the message buffer is completed. In another aspect, the method may further comprise determining, by a publisher node generating the message, the message size, wherein the information indicative of where in the message buffer the message ends is a pending location determined by the size of the message. In another aspect, writing each of the plurality of groups of messages comprises writing, for each message, the size of the message. In another aspect, the size of the message comprises the sum of the message payload and message padding.

In another aspect of the method, the method further comprises determining if the message size is greater than the message size allocated in the respective message buffer for storing messages, and in response to determining the message size is greater, reallocate a bigger message storage size in the respective message buffer. In another aspect, the message further comprises for each message topic, generating at the registry, a count of the number of messages of a topic stored in a respective message buffer. In another aspect, the new message information comprises the count of the number of messages of a topic stored in a respective message buffer. In another aspect, the method further comprises generating, at each subscriber node, read message information that includes a count of the messages of a topic that have been read by said each subscriber node. In another aspect, determining if at least one new message associated with a topic is available comprises comparing, at each subscriber node, the count of the new messages of a topic in the new message information on the registry to the count of the messages of a topic that have been read by the subscriber node, the method further comprising determining a new message associated with the first topic is available for reading when the new message count is greater than the read message counter of the subscriber node. In another aspect, each of the plurality of modules is implemented on at least one processor. In another aspect, at least two subscriber nodes are associated with at the same topic. In another aspect, at least one subscriber node is associated with two or more topics.

In another aspect, reading from the registry comprises reading from the registry without utilizing the kernel of the computer system. In another aspect, reading from the message buffer comprises reading from the message buffer without utilizing the kernel of the computer system. In another aspect, writing to the registry comprises writing to the registry without utilizing the kernel of the computer system. In another aspect, writing to a message buffer comprises writing to the message buffer without utilizing the kernel of the computer system. In another aspect, the registry and the plurality of message buffers are configured to be shared memory locations that can be accessed directly by the publisher nodes. In another aspect, the registry and the plurality of message buffers are configured to be shared memory locations that can be accessed directly by the subscriber nodes.

Another innovation includes a method of communicating messages between a plurality of modules in a system on a vehicle, each module of the plurality of modules implemented on at least one processor and configured as a publisher node that writes messages, a subscriber node that reads messages, or both a publisher node and a subscriber node, the publisher nodes and the subscriber nodes collectively forming a plurality of nodes that communicate in the operation of the vehicle. In some embodiments, the method includes generating a first message associated with a first topic by a first publisher node, writing, by the first publisher node, the first message in a memory location in a first message buffer of the plurality of message buffers, the first message buffer associated with the first topic and configured to store a plurality of messages associated with the first topic, the other of the plurality of buffers each associated with a unique message topic and configured to each store a plurality of messages related to its associated message topic, wherein the memory location where the first message is stored is a shared memory location accessible to subscriber nodes that are configured to read messages related to the first topic, and writing in a registry, by the first publisher node, information associated with writing the first message, the registry configured to store location information indicating a communication address of the first message buffer and location information indicating the memory location on the first message buffer where first message is stored.

Embodiments of methods described herein may have one or more other aspects (features) in various embodiments of the system, a number of these aspects being noted here. However, various embodiments of such method may have additional aspects or fewer aspects, and the aspects disclosed herein can be used together in an number of embodiments even if specifically not illustrated or described as being in a certain embodiment, as one of ordinary skill in the art will appreciate. For example, in one aspect writing the first message in the first message buffer comprises writing the first message in the first message buffer via a communication bus configured to communicate messages between the plurality of nodes and a plurality of message buffers. In another aspect, writing information associated with the first message in the registry comprises writing information associated with the first message in the registry via the communication bus, wherein the communication bus is further configured to communicate location information between the registry and each of the plurality of nodes. In another aspect, writing the first message in the first message buffer comprises directly writing the first message in the first message buffer via the communication bus. In another aspect, directly writing the first message in the first message buffer comprises writing the first message in the first message buffer without interaction in the communication by a kernel of the system. In another aspect, writing information associated with the first message in the registry comprises directly writing information in the registry by the first publisher node via the communication bus. In another aspect, directly writing information associated with the first message in the registry comprises writing the information in the registry without interaction in the communication by a kernel of the system. In another aspect, the first publisher node is further configured to communicate information associated with writing the first message in the first message buffer directly to the registry via the communication bus. In another aspect, the plurality of nodes comprises a plurality of publisher nodes and a plurality of subscriber nodes.

In another aspect of such methods, each of the plurality of publisher nodes writes a plurality of messages each message being associated with a particular topic, and wherein the messages of the plurality of messages that are associated with the same topic are written by the same one of the publisher nodes. In another aspect, the method may further include generating a second message associated with the first topic by the first publisher node, writing, by the first publisher node, the second message in a memory location in the first message buffer, and writing in the registry, by the publisher node, information associated with writing the second message in the first message buffer, wherein the registry is further configured to store location information indicating the memory location in the first message buffer where the second message is stored. In another aspect, the method may further include generating a second message associated with a second topic by a second publisher node, writing, by the second publisher node, the second message in a memory location in a second message buffer of the plurality of buffers, and writing in the registry, by the second publisher node, information associated with writing the second message in the second message buffer, wherein the registry is further configured to store location information indicating the memory location in the second message buffer where the second message is stored. In another aspect of the method, the method may further include determining, by the first publisher node, the location in the first message buffer next available to store a message, wherein the plurality of nodes are configured such that the first publisher node is the only publisher node that writes to the first message buffer, and storing the second message in the first message buffer beginning at the determined next available storage location. In another aspect, each of the plurality of message buffers are configured as ring buffers. In another aspect, the information stored by the topic registry for each message comprises data representative of the topic of each message. In another aspect, the plurality of message buffers and the registry are implemented on one or more storage components of the system that are different components from the storage components implementing any of the plurality of modules. In another aspect, the location information further indicates the end of a message being written to the message buffer. In another aspect, the registry is further configured to store location information of all the messages stored on the plurality of message buffers.

Another innovation includes a method of communicating messages between a plurality of modules in a system on a vehicle, each module of the plurality of modules configured as a publisher node that writes messages, a subscriber node that reads messages, or both a publisher node and a subscriber node, the publisher nodes and the subscriber nodes collectively forming a plurality of nodes that communicate in the operation of the vehicle. In some embodiments, the method includes communicating, by each of a first group of subscriber nodes comprising at least one subscriber node, with a registry (sometimes referred to herein as a "topic registry") to read information on the registry for determining if a new message associated with a first topic is available for reading, each of the first group subscriber nodes configured to read messages associated with the first topic, and then determining, by each of the first group subscriber nodes, if a new message associated with the first topic is available for reading using the information read from the registry. The method further includes, in response to determining a new message associated with the first topic is available for reading, reading from the registry, by each of the first group subscriber nodes, location information indicating where the first message is stored in a first message buffer associated with the first topic and configured to store messages associated with the first topic, the first message buffer being one of a plurality of buffers, each of the plurality of buffers being associated with a different topic, and reading, by each of the first group subscriber nodes, the first message from the first message buffer using the location information indicating where the first message is stored.

Embodiments of methods described herein may have one or more other aspects (features) in various embodiments of the system, a number of these aspects being noted here. However, various embodiments of such methods may have additional aspects or fewer aspects, and the aspects disclosed herein can be used together in a number of embodiments even if specifically not illustrated or described as being in a certain embodiment, as one of ordinary skill in the art will appreciate. For example, in one aspect of the method, communicating with the registry for information to determine if a new message associated with the first topic is available includes reading from the registry, by each first group subscriber node, new message information associated with the first topic and comparing the new message information from the registry to read message information stored at each of the first group subscriber nodes. In another aspect, the new message information comprises a new message counter, the method further comprising incrementing the new message counter when a message associated with the first topic is written to the first message buffer. In another aspect, the read message information for each of the first group subscriber nodes includes a read message counter, the method further comprising incrementing, by each of the first group of subscriber nodes, its read message counter when it reads a new message related to the first topic from the first message buffer. In another aspect, comparing the new message information from the registry to read message information comprises comparing, by each subscriber node of the first group of subscriber nodes, the new message counter of the registry with the read message counter of the subscriber node. In another aspect, the method further comprises determining a new message associated with the first topic is available for reading when the new counter message is greater than the read message counter. In another aspect, each of the plurality of modules is implemented on at least one processor. In another aspect, the first group of subscriber nodes includes at least two subscriber nodes.

In another aspect, the method further includes communicating with the registry, by each of a second group of subscriber nodes configured to read messages associated with a second topic, for information to determine if a new message associated with the second topic is available for reading, the second group of subscriber nodes comprising at least one subscriber node, determining, by each second group subscriber node, if a new message associated with the second topic is available for reading, in response to determining a new message associated with the second topic is available, reading from the registry, by each of the second groups subscriber nodes, location information indicating where the second message is stored in a second memory buffer, the second memory buffer associated with the second topic and configured to store messages associated with the second topic, and reading, by each of the second group subscriber nodes, the second message from the second message buffer using the location information indicating where the second message is stored. In some embodiments, at least one subscriber node in the first group of subscriber nodes is also a subscriber node in the second group of subscriber nodes. In one aspect, the reading from the registry and from the first message bus comprises reading from the registry and from the first message bus via a communication bus configured such that subscriber nodes can read location information from the registry and can read messages from the first message buffer without utilizing a kernel of the computer system. In another aspect, the registry is configured to store location information indicating a communication address of the first message buffer and location information indicating the memory location on the first message buffer where the first message is stored. In another aspect, the registry is further configured to store information associated with messages stored on the plurality of message buffers indicative of the topic each stored message is associated with. In another aspect, the registry is configured to store location information comprising data indicating a communication address of the first message buffer and the memory location of the first message buffer where the first message is stored. In another aspect, the registry is configured to store location information comprising data indicating a communication address of the first and second message buffer, the memory location on the first message buffer where the first message is stored, and the memory location on the second message buffer where the second message is stored.

In such methods, a further aspect may include that the location information stored by the registry for each message include data indicating the frequency that each message associated with a particular topic is published. In some embodiments of such methods described herein, a method may further comprise communicating periodically, by each of the subscriber nodes in the first group of subscriber nodes, with the registry to determine if a new message is available for reading. In another aspect, communicating periodically, for each subscriber node, includes communicating with the registry to determine if a new message is available for reading at a pre-determined frequency. In another aspect, communicating periodically, for each subscriber node, includes communicating with the registry to determine if a new message is available for reading at a pre-determined frequency which is different for at least two of subscriber nodes. In another aspect, communicating periodically includes, for at least one of the subscriber nodes, communicating with the registry to determine if a new message is available for reading at a dynamically determined frequency.

BRIEF DESCRIPTION OF THE DRAWINGS

The features and advantages of the devices described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION OF CERTAIN INVENTIVE ASPECTS

Figure 1A:
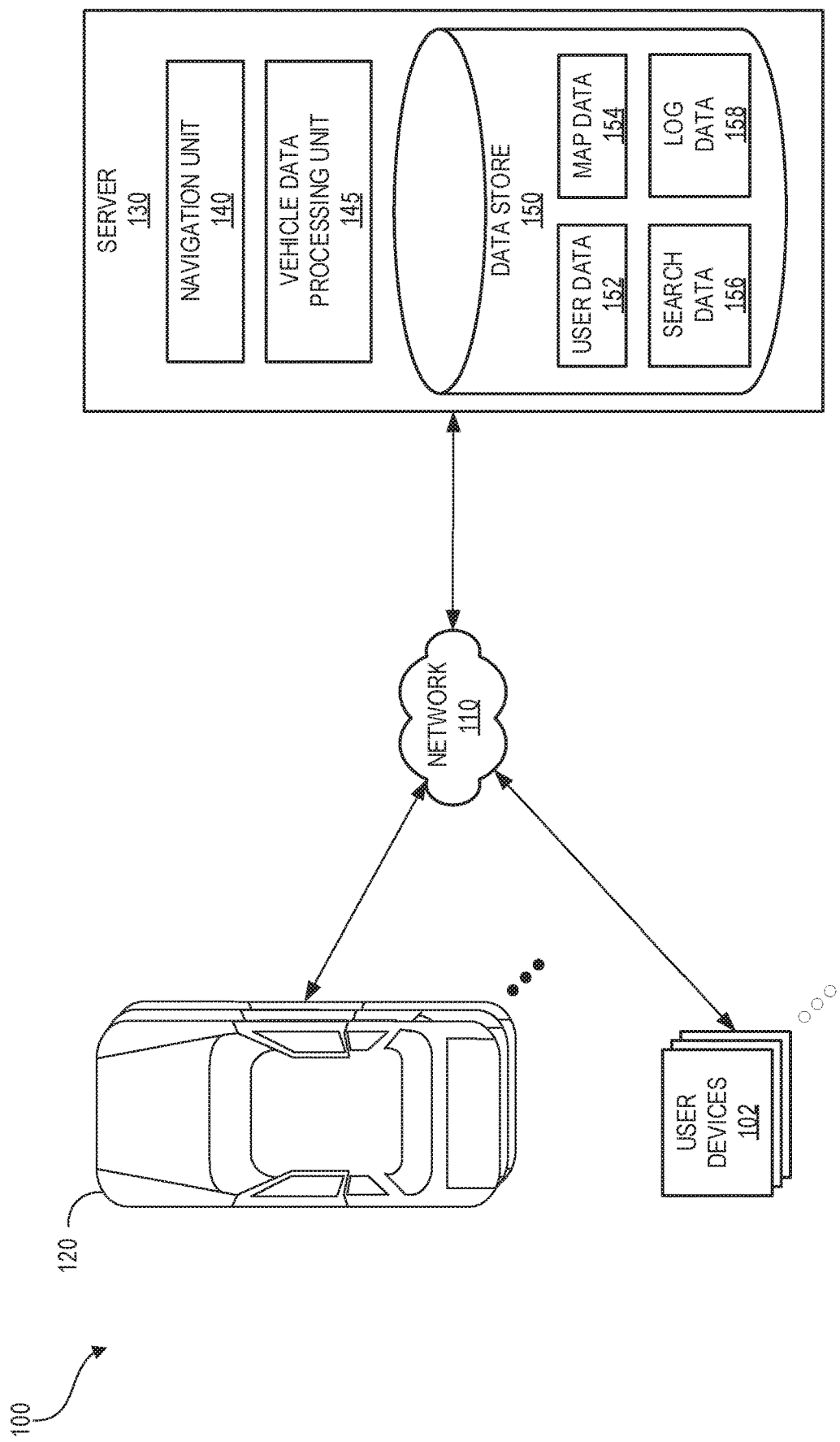
FIG. 1A illustrates a block diagram of a networked vehicle environment in which one or more vehicles and/or one or more user devices interact with a server via a network, according to one embodiment

The following detailed description is directed to certain aspects and examples of the invention. However, the invention can be embodied in a multitude of different ways. It should be apparent that the aspects herein may be embodied in a wide variety of forms and that any specific structure, function, or both being disclosed herein is merely representative of one or more embodiments of the invention. An aspect disclosed herein may be implemented independently of any other aspects and that two or more of these aspects may be combined in various ways. For example, different embodiments of shared memory communication systems may be implemented using a number of the aspects/features disclosed herein. In addition, such a method may be implemented or such a system may be practiced using other processes, steps, structure, functionality, or structure in addition to, or other than one or more of the aspects set forth herein.

Illustrative Embodiment

Embodiments of systems and methods for loading map data are described below in reference to the figures. It will be appreciated by those of ordinary skill in the art that various modifications and changes may be made without departing from the scope of the described technology. Such modifications and changes are intended to fall within the scope of the embodiments. It will also be appreciated by those of ordinary skill in the art that parts included in one embodiment are interchangeable with other embodiments— one or more parts from a depicted embodiment can be included with other depicted embodiments in any combination. For example, any of the various components described herein and/or depicted in the figures may be combined, interchanged or excluded from other embodiments.

Embodiments of a shared memory message system for communication in a computer system in a vehicle address problems described above relating to having a plurality of functional modules that collectively represent multiple message publishers and multiple message subscribers distributed over multiple subsystems within the collective computer system of the vehicle. In one embodiment, for each topic, there is a single publisher of the messages for the topic, and there can be multiple subscribers for any message that is published relating to any topic. Embodiments use shared memory is the underlying message transport. Such embodiments have multiple advantages. Including, for example, concurrent read and write operations, pure user space synchronization, and no locks or system calls to schedule and/or otherwise address (e.g., by the kernel). Another advantage is that the design is crash safe. Both publishers and subscribers can crash and then safely rejoin after they have started again after the crash. A publisher will always succeed in writing its message. Because ring buffers are used in the described embodiments, if the buffer is full, the buffer overwrites the oldest message. In such instances, a subscriber may safely detect than overwrite has occurred and can subsequently try to read a more current message.

Because the operations of the publisher and of the subscriber are not connected, a slow subscriber will have no effect on the publisher publishing its messages. This is significantly different than a typical system where the kernel facilitates the communication between a publisher and a subscriber, establishing a communication channel specifically between each publisher and subscriber, and thus if a subscriber is slow in the communication process the publisher operations are delayed. In addition, the publisher copies is a message to the shared memory only once. Thus, the number of subscribers has no effect on the publisher, nor does it increase the number of communication operations the kernel has to execute.

Generally, in this architecture, there are two types of shared memory regions implemented on storage devices, a topic registry and two or more message buffers. The functionality of the described architecture of a topic registry and a plurality of message buffers may be implemented in various specific ways in different embodiments described herein are several illustrative embodiments of this architecture. In such systems, there may be numerous publisher nodes. For each message of a particular topic, there is one publisher node that writes the messages for that topic to a shared memory space. Multiple subscriber nodes may be configured to read the messages related to a particular topic from the shared memory space. In addition, a subscriber node that is configured to read a message related to one topic may also be configured to read other messages related to other topics. That is, each publisher node is configured to write a message related to a certain topic to a shared memory space such that it can be easily read by at least one subscriber node.

Each of the two or more message buffers stores messages related to a single topic. That is, all of the messages that are stored in a particular message buffer are related to the same topic. The message buffers may be ring buffers. The topic registry can be a centralized array configured to store metadata for messages that are stored in one of the message buffers. Each element (e.g., a "topic record" that is stored) in the topic registry corresponds to metadata of a particular message stored in one of the message buffers. The mapping between message topics and indices in the message buffer is common knowledge among different modules of the system. In some embodiments, the information stored in the topic registry from each message indicates the address of the message buffer with the messages stored, and the name of the topic the message relates to. Accordingly, a subscriber node that from time to time (e.g., in accordance with a certain cycle for that subscriber node) wants to read messages that it subscribes to, can check the topic registry to determine messages that are related to the topics that it subscribes to, where those messages are found, and then can access those messages using the information from the topic registry to read those messages from the corresponding message buffers where those messages are stored.

In some embodiments the topic registry also includes information related to the frequency at which a message is published by a certain publisher node. In some embodiments, if a node is not publishing a message at the frequency that is expected (as indicated by the frequency information for that message on the topic registry), a system alert may be generated. For example, a vehicle, such as an autonomous vehicle, a vehicle that provides driver-assist features, and/or a vehicle used for location-based services, can use multiple sensors constantly to determine information about its environment. If a sensor publisher node that publishes messages related to LiDAR (e.g., a LiDAR image) stops publishing its messages or publishes its messages at a frequency that is lower than the expected message frequency as indicated by the information for that message topic in the topic registry, an alert may be generated to inform the control system that there is an unexpected condition occurring so it may take action to mitigate the loss or impairment of the LiDAR data.

There may be many specific ways to implement the architecture of embodiments described herein. Regardless of the particular implementation, a publisher node is configured to write to a message buffer configured to store messages of a particular topic, and uses topic registry information to determine where to write the message; similarly, a subscriber node uses topic registry information to determine where to read the messages that it subscribes to, and reads these messages from the shared storage space of the message buffer. The publisher nodes may write their messages to a message buffer an update the topic registry without using the computer system kernel to manage this communication. The "kernel" as referred to herein is a broad term that refers to the computer program that is the core of a computer's operating system and that has complete control over everything in the system. For example, the kernel connects the application software to the hardware of the computer system. The kernel may be one of the first programs loaded during startup and it may handle the rest of the start procedure, as well as input/output requests from software, translating them into data processing instructions for a central processing unit. Also, the kernel peripherals to the computer system and manages its memory. As discussed above, through the use of this shared memory architecture that decouples the direct communication between a publisher node (e.g., a module performing a certain function and writing a message related to the function, for example, an output image) and a subscriber node (e.g., a performing a another function and reading a message related to that function, for example, in input image), many advantages can be achieved including, for example, reducing the number of communication tasks the kernel has to manage.

In some embodiments, the metadata in the topic registry for a message topic contains two variables, sometimes referred to as a tail_offset, and a pending_tail_offset, which are used for synchronizing read and write operations. Generally, the tail_offset refers to a space in the message buffer where the message starts. The pending_tail_offset refers to a space in the message buffer where a message that is being written is going to end. Such variables are written by the publisher and read by the subscribers. For each message topic, there is a ring buffer to store the messages, and the topic registry includes the address for the message buffer that stores the messages for each topic. The topic registry also includes metadata indicative of the name of each topic, such that a subscriber of a certain topic can reference this metadata to identify and read only those messages of the topics it is a subscriber to. The topic registry may also contain information indicative of the frequency at which messages are published. Because the topic registry includes information indicating the topic associated with each message, there can be one topic registry that includes metadata for every message stored regardless of the topic, and for each topic there is a ring buffer that is configured to store messages related to that topic. That is, the topic registry includes metadata for each topic. Each topic corresponds to a message buffer. Each message buffer can store one or multiple messages belonging to the topic. In instances where messages relating to various topics are of different sizes, the space allocated in the message buffer corresponding to the topic is set to accommodate the particular message it stores. In the message buffer, each message may be written suffixed with its size.

In some embodiments of such shared memory communication systems, it can be useful for subscribers to know whether messages have been dropped or for monitoring service to determine whether messages are published at the desired rate. To facilitate this functionality, a message counter may be implemented on both the topic registry and the subscriber. Every time a message is written for a topic a message counter associate with the topic is incremented. Every time a message is read by a subscriber of a particular topic its message counter associate with the topic is incremented. By comparing the message counter in the topic registry to a message counter of the subscriber, the subscriber can determine whether messages have been dropped and can determine whether messages are being published at the desired rate.

In some cases, the messages that are published for particular topic (and that are stored in a particular message buffer) may vary in size. Accordingly, in some embodiments, the publisher is able to allocate a larger storage space on the message buffer when it wants to write a message bigger than a previously allocated storage space.

To facilitate the above-described functionality of the shared memory communication system, all of the message topics are required to be declared at compile time. The information needed for each topic may include, for example, topic name, maximum message size for a published message, shared memory message buffer size, and the publish rate. Because all topics are known at compile time, metadata such as an integer ID can be automatically assigned to the topics and used as indices into the topic registry. In some embodiments where there are different types of messages, for example, on-board messages, off-board messages, and testing messages, each different type of message may be managed by a different topic registry. Accordingly, some embodiments may include two or more topic registries where each topic registry manages a different type of message in such embodiments, each topic registry is associated with message buffers that each store a message of a particular topic.

Although shared memory architecture described herein doesn't rely on knowledge of nodes, for the purpose of system monitoring, in some embodiments the knowledge may be useful to also define the computation graph statically. In such embodiments, information needed for each node may include input message topics and output message topics. In some embodiments, topic/node information could be specified in JavaScript Object Notation (JSON) format (and optionally define the schema in protobuf) so that it is easy to access from python/js/etc. at run-time in addition, we could generate C++ source code of compile-time constants to make it easier and more efficient to use from C++.

In some embodiments, in order to make it easier to calculate and adjust characteristics of system, (e.g., the maximum message size and the message size buffers), the system can be configured to monitor the message generated and determine distributions for the various characteristics. Even if the characteristics are not adjustable for current messages, the messages could be passed and alerts could be sent to developers to indicate that adjustments to these characteristics need to be made. For example if some messages are larger than the maximum message size but smaller than the message buffer size, these messages can still be passed for processing but each time the event could be recorded as a warning to let developers know that they need to adjust the configuration characteristics for that topic. If the messages are larger than the message buffer size, these messages could be dropped and the event could be recorded as a more serious warning to developers such that it is addressed as soon as possible.

Although it is possible to have a system where there is more than one publisher node per topic, in almost all cases there will be only one publisher node per topic. Accordingly, in such embodiments, the system may be designed to support only one publisher per topic and a fixed path may be determined for the naming scheme for shared memory files. For example:

Topic registry: /dev/shm/voy.<session_id>.topic_registry.<namespace>
Topic:/dev/shm/voy.<session_id>.topic_registry.<namespace>.<topic_index>.<generation)id>

In some embodiments, the filename can be limited to no greater than 255 characters.

In some embodiments, the determination of the session ID can be done using the value from a command line flag (if it exist), or using the port number from the ROS_MASTER_URI env variable (if it exist), or using some default value such as zero. Shared memory files are not deleted. To make sure subscribers don't read still messages from the previous session using the same session ID, subscribers may set an index indicator of the messages that they're going to read to be the equivalent of the end of the last message that was published for the topic, for example, set subscriber "head" (where the subscriber is going to start to read) to "tail_now" (the end of the last message for the particular topic the subscriber is subscribing to). Although this may result in the subscriber missing all messages that the publisher has already published, as messages are currently and/or constantly being published in such real-time systems, this may have a minimal, if any, effect on most operations.

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
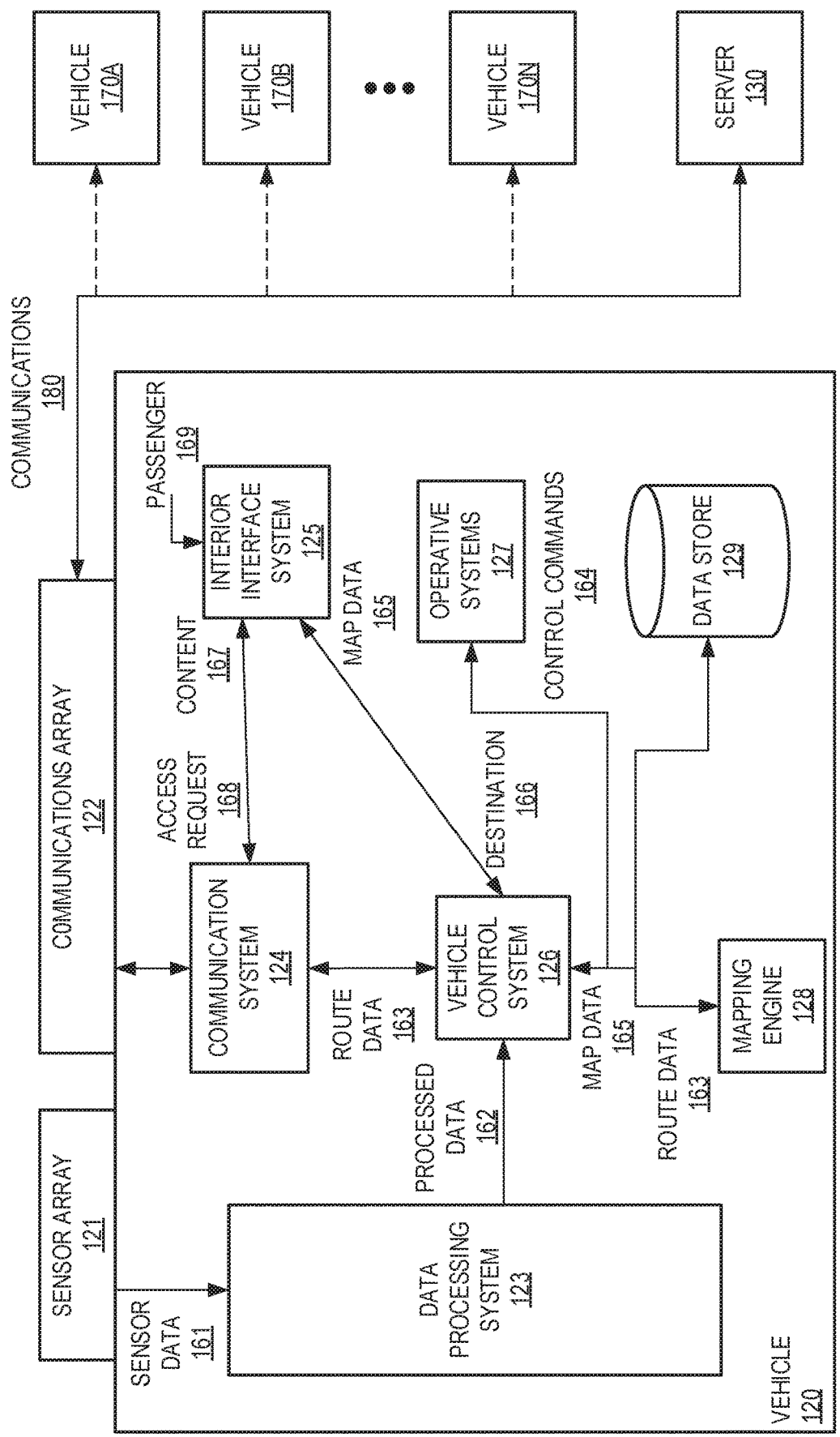
FIG. 1B illustrates a block diagram showing the vehicle of FIG. 1A in communication with one or more other vehicles and/or the server of FIG. 1A, according to one embodiment

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Figure 2:
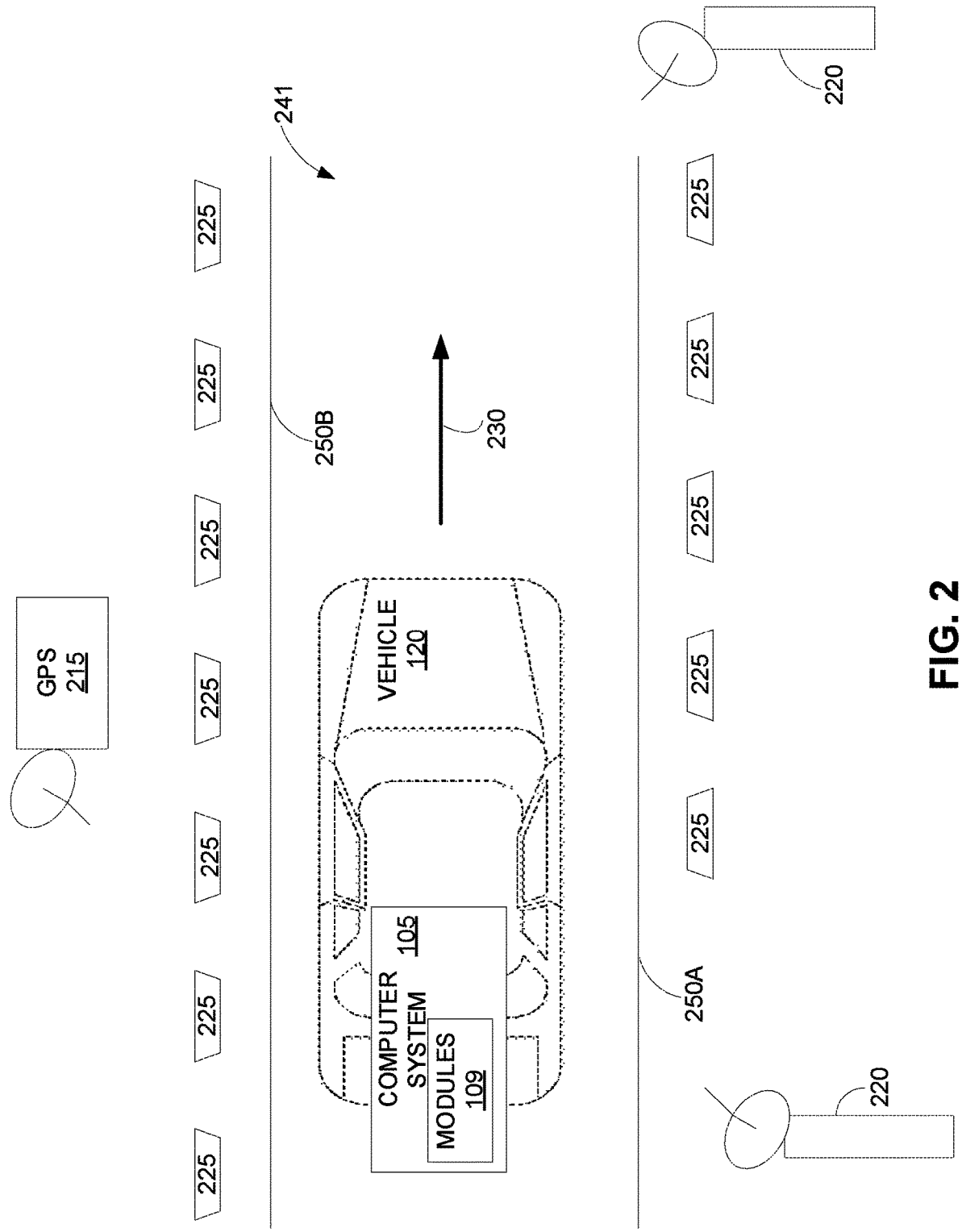
FIG. 2 is a schematic illustrating a vehicle moving along a road and examples of components that the vehicle may use to determine its geographical location information.
Figure 3:
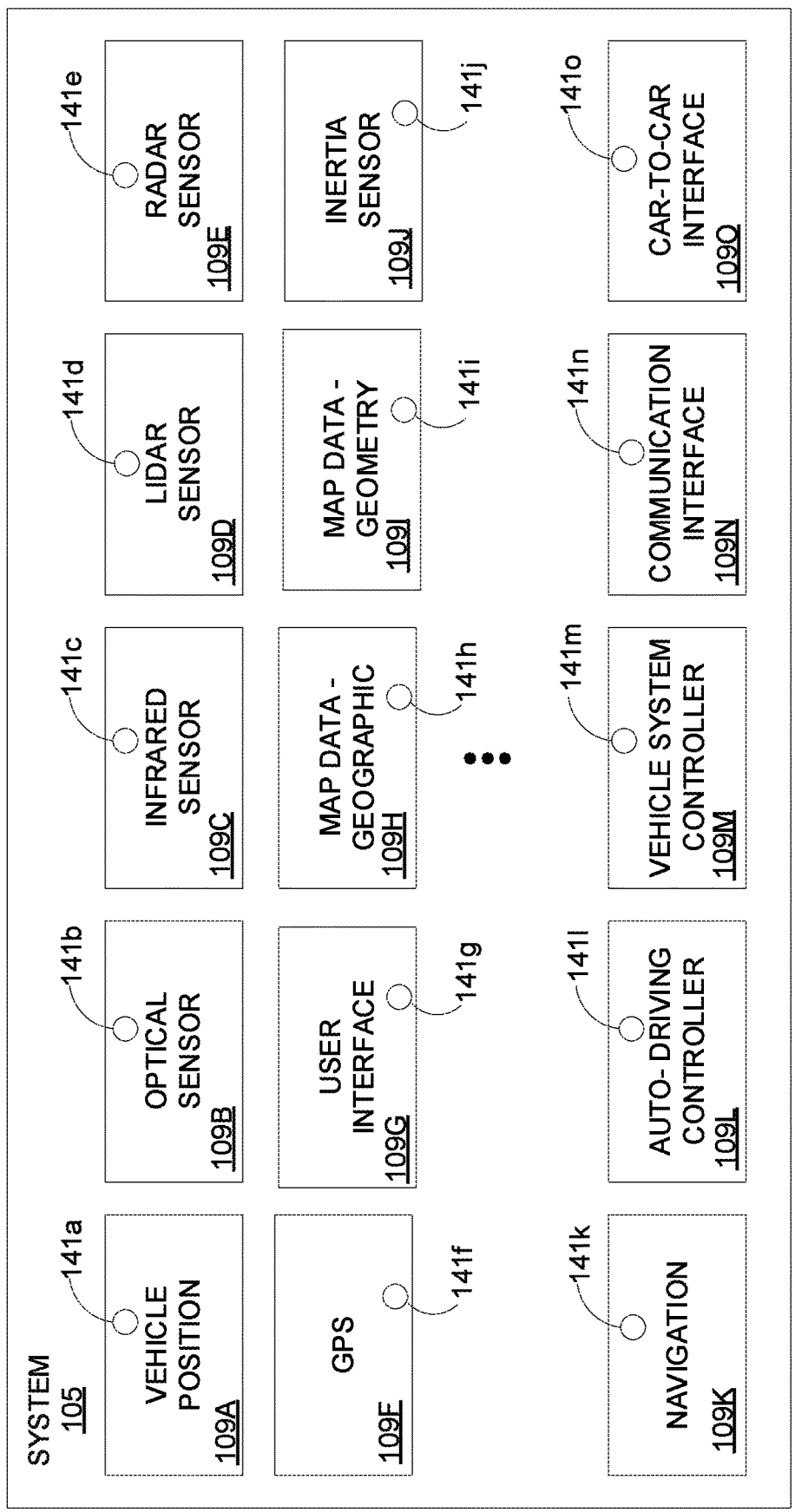
FIG. 3 is a schematic illustrating an example of various modules that may be in a computer system in a vehicle in some embodiments, each of the modules associated with a representative node which the module may use for publishing messages of a certain topic and for subscribing to messages of one or more topics, for example, messages published by one or more of the other modules.

FIG. 2 is a schematic illustrating a vehicle moving along a road and examples of components that the vehicle may use to determine its geographical location information. A computer system 105 is on the vehicle 120, and operates to partially or fully control the vehicle. The computer system 105 may include any of the components of the vehicle 120 described above with respect to FIG. 1B. In instances where the vehicle 120 is operating in an autonomous mode, the computer system 105 fully controls the vehicle. The computer system 105 is configured to perform numerous functions relating to localization, perception, planning, and control operations to control the vehicle 120. For example, in various embodiments of the invention, one or more of the described components, or one or more other components, may be used to determine the vehicle's location. Various functions and operations of the computer system 105 may be performed by modules 109 of the computer system 105. Illustrative examples of types of modules that may be implemented in a computer system 105 on a vehicle are illustrated in FIG. 3. During operations of the computer system 105 to control the vehicle 120, the various modules 109 communicate messages of various topics, some modules 109 writing messages, some modules 109 reading messages. The modules 109 that write messages may be represented as publisher nodes, and the modules 109 that read messages may be represented as subscriber nodes, in the context of embodiments of a shared communication system described herein.

FIG. 2 illustrates an example the vehicle 120 moving along a road 241. The road 241 may be part of the route from the first point to a second point that the vehicle 120 is controlled to autonomously traverse. In FIG. 2, vehicle 120 is moving along the road 241 at a speed and in a direction indicated by motion vector 230. FIG. 2 also illustrates examples of positioning components that may be used by the vehicle 120, or provide to the vehicle 120, either passively or actively, geographical location information that the vehicle 120 may use to determine the location (e.g., a geographic location) of the vehicle 120.

As the vehicle 120 moves along the road 241, positioning components that are along the road 241 or in communication with sensors on the vehicle 120 may be used to help control and/or position the vehicle 120. FIG. 2 illustrates a few examples of such positioning components, and examples of sensing systems that may be used for positioning and controlling the vehicle are described herein. In one example, proximal positioning components 250A, 250B may run along the road 241. In various embodiments, such components may be contiguous or closely arranged, and may either be passive (sensed by a sensor on the vehicle 120, e.g., be reflective of a transmitting sensor on the vehicle 120, or be sensed by an IR or optical sensor), or active (e.g., transmit radiation sensed by the vehicle 120). One or more distal positioning components 225 may be arranged beside the road or off the road as certain distance. The distal positioning components 225 may also be active or passive, and various embodiments. In some embodiments, a GPS transmitter 215 may provide GPS signals that are received by the vehicle 120. In some embodiments, one or more fixed transmitters 220 may be disposed along the road 241, and provide the vehicle 120 with transmissions or communications that can be used by vehicle 120 to determine its location.

In various embodiments, the vehicle 120 may include a sensor system as part of the computer system 105, or may include a sensor system on the vehicle that interfaces with the computer system 105. In various embodiments, the sensor system may include one or more sensors configured to sense information about an environment, including positioning components, in which the vehicle 120 is located. In various embodiments, the one or more sensors may include, one or more of a Global Positioning System (GPS) module, an inertial measurement unit (IMU), a radio detection and ranging (RADAR) unit, a laser rangefinder and/or light detection and ranging (LiDAR) unit, an infrared (IR) camera, and/or an optical camera. The GPS module may be any sensor configured to estimate a geographic location of the vehicle 120. To this end, the GPS module may include a transceiver configured to estimate a position of the automobile 100 with respect to the Earth, based on satellite-based positioning data. In an example, the computer system 105 may be configured to use the GPS module in combination with the map data to estimate a location of a lane boundary on road on which the vehicle 120 may be travelling on.

The IMU may be any combination of sensors configured to sense position and orientation changes of the vehicle 120 based on inertial acceleration. In some examples, the combination of sensors may include, for example, accelerometers and gyroscopes. Other combinations of sensors are possible as well.

The RADAR unit may be considered as an object detection system that may be configured to use radio waves to determine characteristics of the object such as range, altitude, direction, or speed of the object. The RADAR unit may be configured to transmit pulses of radio waves or microwaves that may bounce off any object in a path of the waves. The object may return a part of energy of the waves to a receiver (e.g., dish or antenna), which may be part of the RADAR unit as well. The RADAR unit also may be configured to perform digital signal processing of received signals (bouncing off the object) and may be configured to identify the object.

Other systems similar to RADAR have been used in other parts of the electromagnetic spectrum. One example is LiDAR (light detection and ranging), which may be configured to use visible light from lasers rather than radio waves.

The LiDAR unit may include a sensor configured to sense or detect objects in an environment in which the vehicle 120 is located using light. Generally, LiDAR is an optical remote sensing technology that can measure distance to, or other properties of, a target by illuminating the target with light. As an example, the LiDAR unit may include a laser source and/or laser scanner configured to emit laser pulses and a detector configured to receive reflections of the laser pulses. For example, the LiDAR unit may include a laser range finder reflected by a rotating mirror, and the laser is scanned around a scene being digitized, in one or two dimensions, gathering distance measurements at specified angle intervals. In examples, the LiDAR unit may include components such as light (e.g., laser) source, scanner and optics, photodetector and receiver electronics, and position and navigation system.

In an example, The LiDAR unit may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LiDAR applications, such as Rayleigh scattering, Mie scattering and Raman scattering, as well as fluorescence. Based on different kinds of backscattering, LiDAR can be accordingly called Rayleigh LiDAR, Mie LiDAR, Raman LiDAR and Na/Fe/K Fluorescence LiDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LiDAR systems. "3D gated viewing laser radar" is an example of a non-scanning laser ranging system that applies a pulsed laser and a fast gated camera. Imaging LiDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LiDAR unit.

A point cloud may include a set of vertices in a 3D coordinate system. These vertices may be defined by X, Y, and Z coordinates, for example, and may represent an external surface of an object. The LiDAR unit may be configured to create the point cloud by measuring a large number of points on the surface of the object, and may output the point cloud as a data file. As the result of a 3D scanning process of the object by the LiDAR unit, the point cloud can be used to identify and visualize the object. In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera may be any camera (e.g., a still camera, a video camera, etc.) configured to capture images of the environment in which the vehicle 120 is located. To this end, the camera may be configured to detect visible light, or may be configured to detect light from other portions of the spectrum, such as infrared or ultraviolet light. Other types of cameras are possible as well. The camera may be a two-dimensional detector, or may have a three-dimensional spatial range. In some examples, the camera may be, for example, a range detector configured to generate a two-dimensional image indicating a distance from the camera to a number of points in the environment. To this end, the camera may use one or more range detecting techniques. For example, the camera may be configured to use a structured light technique in which the vehicle 120 illuminates an object in the environment with a predetermined light pattern, such as a grid or checkerboard pattern and uses the camera to detect a reflection of the predetermined light pattern off the object. Based on distortions in the reflected light pattern, the vehicle 120 may be configured to determine the distance to the points on the object. The predetermined light pattern may comprise infrared light, or light of another wavelength. The sensor system may additionally or alternatively include components other than those described here.

FIG. 3 is a schematic illustrating an example of various modules 109 that may be in a computer system 105 of a vehicle, according to some embodiments. Various embodiments of the computer system 105 may have more or less modules 109 or different modules 109, the illustrated modules 109 in FIG. 3 being representative examples of such modules, and our not meant to limit the modules 109 of a computer system 105, or be viewed as being required in any particular computer system 105. In the example illustrated in FIG. 3, the computer system 105 includes a vehicle position module 109A, an optical sensor module 109B, an infrared sensor module 109C, a LiDAR sensor module 109D, a RADAR sensor module 109E, the GPS module 109F, the user interface module 109G, and map data—geographic module 109H, a map data—geometry module 109 I, and inertia sensor module 109J, a navigation module 109K, an auto driving controller module 109L, the vehicle system controller module 109M, the communication interface module 109N, and a car to car interface module 109O.

Each of the modules 109 may send messages and receive messages from any of the other modules 109, other subsystems and components of the computer system 105, or systems that are linked to the computer system 105 that reside off the vehicle 120. To facilitate this communication, the shared message memory architecture described herein may be utilized. For such implementations, each of the modules 109A-0 may be considered to be a representative node 141a-o which may publish messages of a certain topic (e.g., provide a message relating to sensor data, or a control function) and for subscribing to one or more messages of one or more topics, published by other of the one or more of the modules 109.

Figure 4:
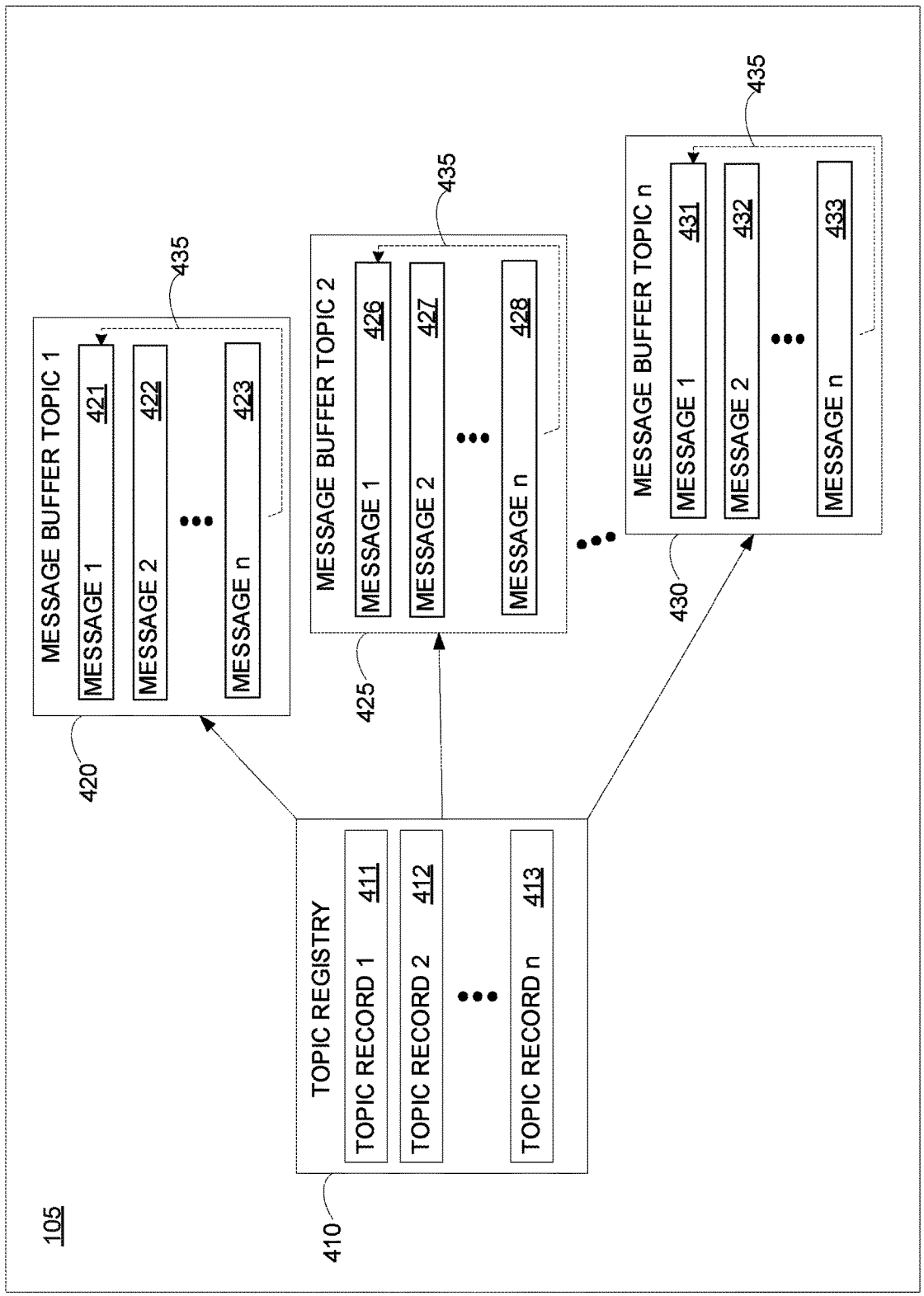
FIG. 4 is a schematic illustrating an example of a shared message communication system that may be implemented in a computer system on a vehicle that provides, for example, more efficient communications between two or more of the modules illustrated in FIG. 3.

FIG. 4 is a schematic illustrating an example of a portion of a shared communication system showing a topic registry 410 and multiple message buffers 420, 425, 430 that can be implemented in a shared message communication system in the computer system 105 on a vehicle that provides, for example, efficient communications between two or more of the modules 109 illustrated in FIG. 3. In various embodiments, a single topic registry 410 may interact with two or more message buffers 420, 425, 430 to allow a publisher node to write a message relating to a certain topic to a message buffer configured to and store messages of that topic, and to allow multiple subscriber nodes to read messages stored on any of the message buffers 420, 425, 430.

The topic registry 410 is a single registry for storing information relating to the messages that are published by all of the nodes 141 in the system. The topic registry 410 includes a topic record 411, 412, 413 relating to each of the messages that are stored in each of the message buffers 420, 425, 430 (e.g., topic record 411 relates to messages that are stored in message buffer 420, topic record 412 relates to messages that are stored in message buffer 425, and topic record 413 relates to messages that are stored in message buffer 430). For each message stored in a message buffer 420, 425, 430, the topic registry 410 includes information that is used for a publisher node to write a message to one of the message buffers 420, 425, 430, and for a subscriber node to read a message from one of the message buffers 420, 425, 430. For example, the topic registry 410 may include for each message the address of the message buffer in which the message is stored, the name of the topic each message relates to, and the frequency at which messages of a topic are expected be published.

The message buffers 420, 425, 430 may be implemented on one or more storage devices. In some embodiments, two or more of the message buffers, may be implemented on the same storage device. Each of the message buffers 420, 425, 430 stores messages of a particular (single) topic. For example, message buffer 420 stores messages 421, 422, 423 of a first topic, message buffer 425 stores messages 426, 427, 428 of a second topic, and message buffer 425 stores messages 431, 432, 433 of a third topic. Because the messages relate to a variety of information (e.g., sensor data, navigation, control functions) the messages of one topic may vary (greatly) in size from messages of a different topic. With each message buffer storing messages of a single topic, memory in each message buffer may be allocated for the expected message size for the messages of the topics that stores. Each message buffer is configured as a ring buffer such that once a message has been written to the last available storage location in the buffer, the buffer wraps around, as indicated by connection 435, to the beginning of the buffer and the writing of the message or other messages may continue.

Figure 5:
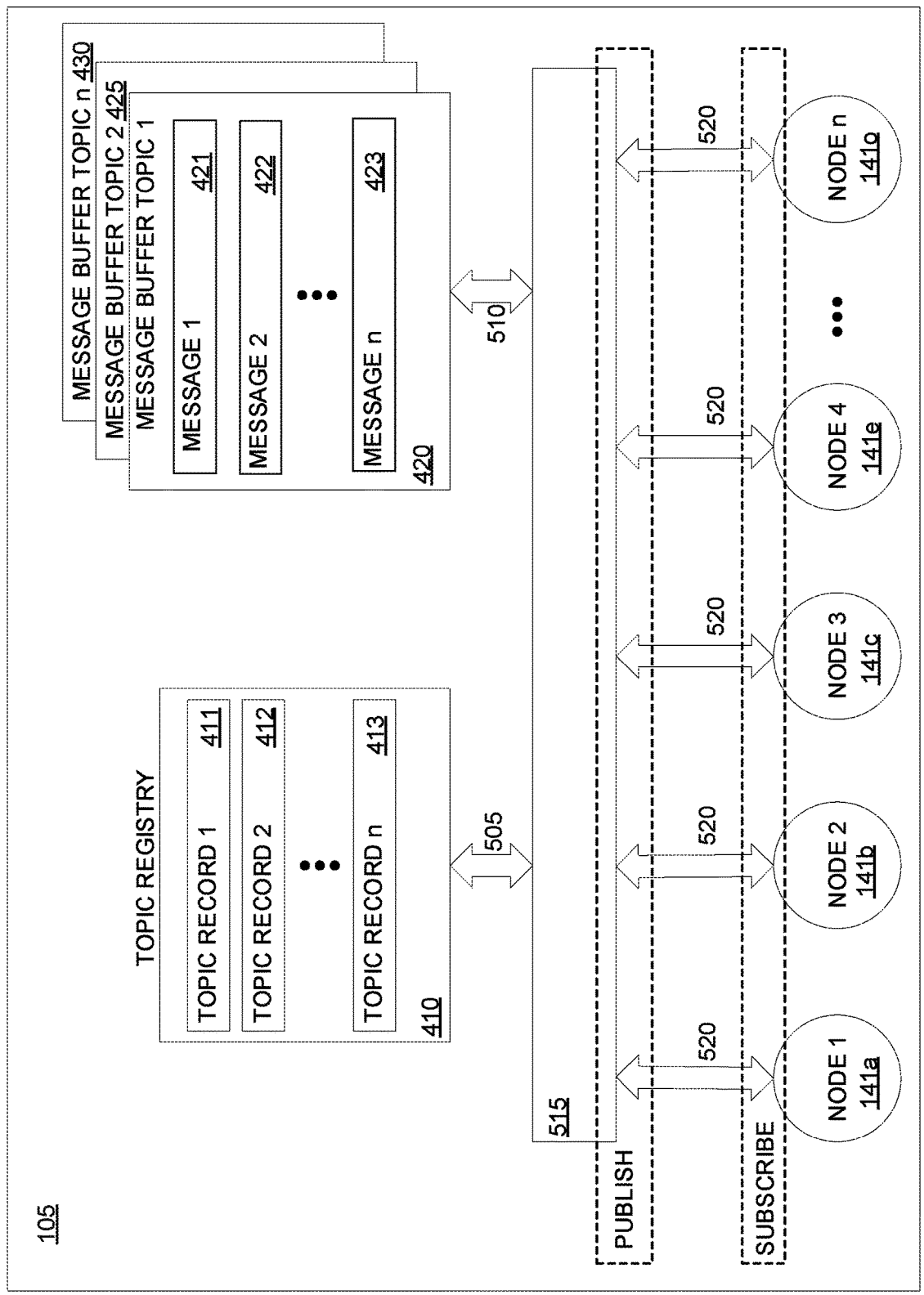
FIG. 5 is a schematic illustrating an example of a shared memory message communication system that may be implemented in a computer system on a vehicle, illustrating a representative architecture that includes a topic registry, two or more message buffers, and communication channels for each of the plurality of nodes to both publish messages of a topic, and subscribe to messages of various topics that are published by one or more of the other plurality of nodes.

FIG. 5 is a schematic illustrating an example of a shared memory message communication system that may be implemented in a computer system on a vehicle, illustrating a representative architecture that includes a topic registry, two or more message buffers, and communication channels for each of the plurality of nodes to both publish messages of a topic, and subscribe to messages of various topics that are published by one or more of the other plurality of nodes. FIG. 5 illustrates the topic registry 410 and message buffers 420, 425, 430 illustrated in FIG. 4 in communication with each other, which may be, or thought of as being, communicating via a communication bus 505, 510, 515, 520 which connect each of the nodes 141a-o to each of the topic registry 410 and applicable message buffers 420, 425, 430. That is, the operational shared memory read/write functionality can be considered the communication bus. For example, the message buffers that the publisher nodes of the plurality of nodes 141 write to or that subscriber nodes of the plurality of nodes 141 read from. Accordingly, as used herein, the term "communication bus" is a broad term that may include any of the hardware or software that allows the operation of the shared memory read and shared memory write operations.

The communication bus represented in FIG. 5 as communication bus 505, 510, 515, 520 may be any suitable bus structure suitable for coupling the nodes 141 to the topic registry 410 and one or more of the message buffers 420, 425, 430 as needed for publishing and subscribing to messages. Although in the FIG. 5 schematic the communication bus is shown as represented as portions 505, 510, 515, and 520, it can also be represented as a single bus communication structure. In various embodiments, the communication bus may include wired or wireless coupling of the nodes 141 to the topic registry 410 and the nodes 141, and the message buffers 420, 425, 430 to perform the operational functionality described herein, and may include any suitable hardware and software for communication of messages and information between the topic registry 410 and the nodes 141, and the message buffers 420, 425, 430 and the nodes 141.

In this architecture, any of the nodes 141 that is a publishing node may access the topic registry 410 via communication bus 505, 515, 520 and may access an applicable one of the message buffers 420, 425, 430 via the communication bus 520, 515, 510 for writing a message to the applicable message buffer and the topic registry relating to the written message. Any of the nodes 141 that is a subscriber node may access the topic registry 410 via portions of the communication bus 520, 515, 505 and may access an applicable one of the message buffers 420, 425, 430 via portions of the communication bus 520, 515, 510 for reading a message from the shared storage on the applicable message buffer.

Figure 6:
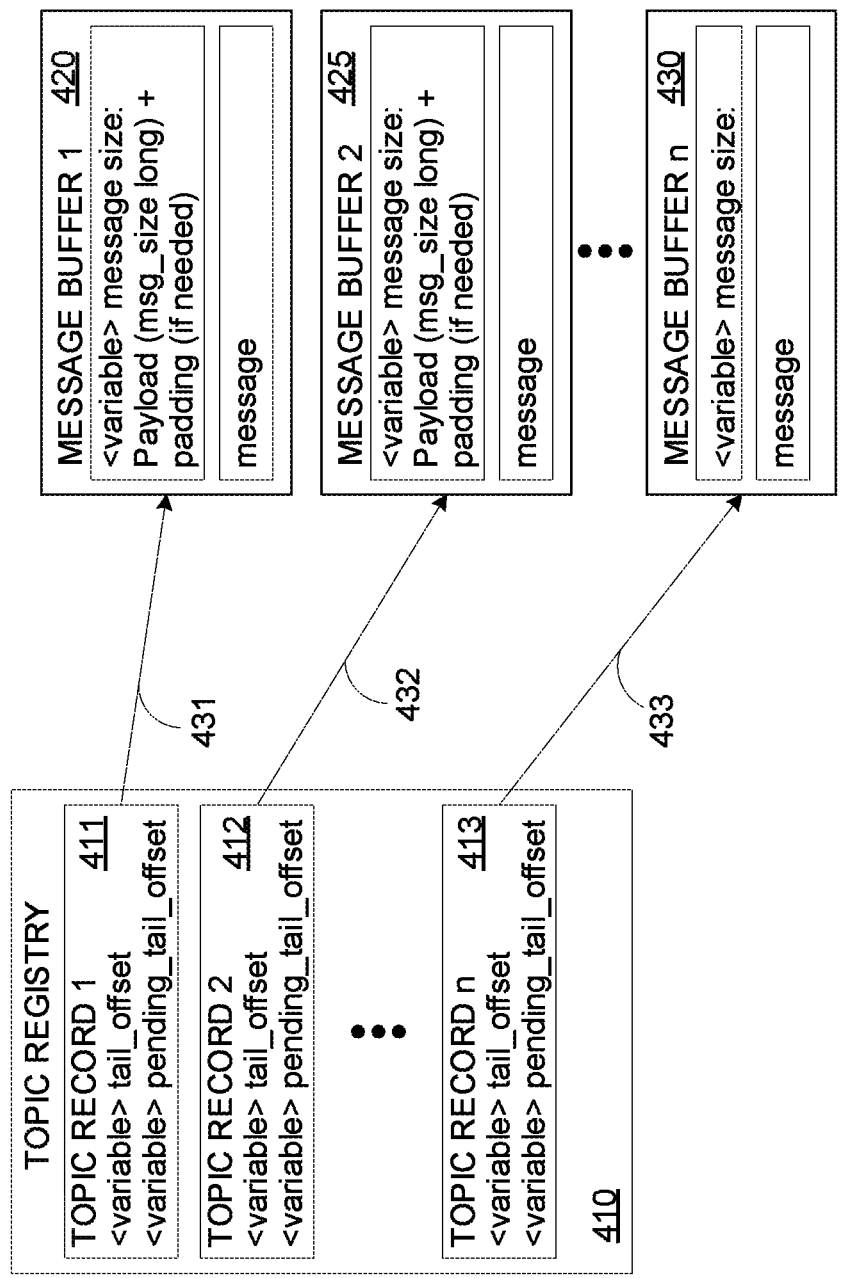
FIG. 6 is a schematic illustrating an example of an embodiment of a topic registry and an associated message buffer for a particular topic.

FIG. 6 is a schematic illustrating an example of an embodiment of a topic registry 410 and an associated message buffer that stores messages for a particular topic. The topic registry 410 includes an entry for each message in a message buffer, for example, a topic record 411, 412, 413. The topic record includes information that publishing nodes access to know where to start writing a new message in the message buffer associated with the topic. The topic record also includes information the subscriber node can access to know where to read messages that it subscribes to. As one of skill in the art will appreciate, various embodiments may include various notations of such indexing information, and what is described herein relates to examples of such information but is not intended to limit the information that can be used.

Each record relates to a separate message buffer. In this example, each topic record 411, 412, 413 relates to a corresponding a message stored in respective message buffers 421, 422, 423. The information in a topic record may indicate where the already written message ends (e.g., a "tail_offset" variable). The information in a topic record may indicate where the being-written message ends (e.g., a "pending_tail_offset" variable), which indicates how much memory a being-written message will be using in the message buffer. The tail_offset variable indicates where the already written message ends in the message buffer, and is used by a subscriber node to indicate where to start reading the new message. The pending_tail_offset variable indicates where a message that is being written to the message buffer will end, and is set by the publisher node when it is writing the message to indicate allocated space for the message. Each message buffer 420, 425, 430 includes a message related to a topic for each of the message entries in the topic registry related to that topic. In various embodiments each message may include additional information (e.g., at the beginning of the message or at the end of the message) relating to the message. For example this information may include the message size, which indicates the size of the content of the message and any additional padding in the message. Various indexing schemes may be used in both the topic registry and the message buffer to facilitate efficiently writing messages into the message buffer and recording information about such messages in the topic registry to allow subscriber nodes and publisher nodes to efficiently access the topic registry in the message buffers to read and write messages.

Figure 7:
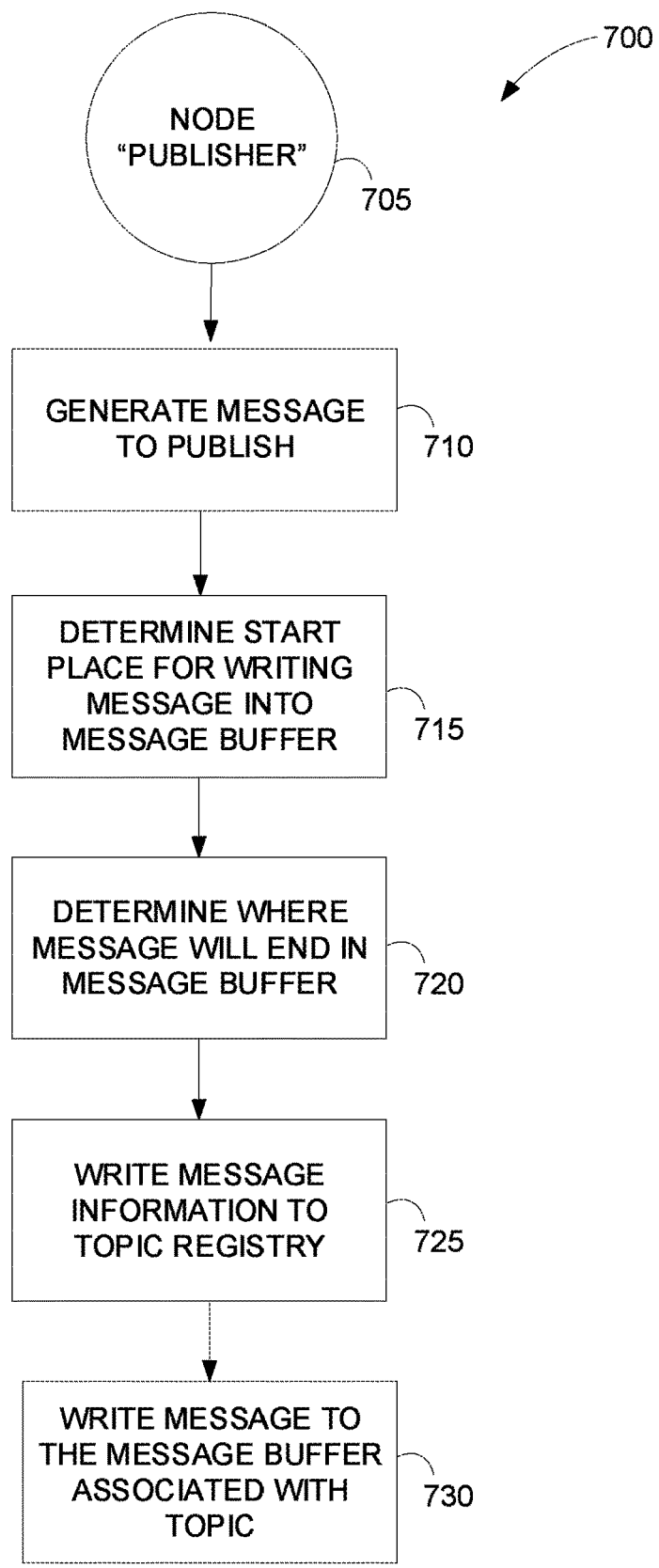
FIG. 7 is an illustration of a flow diagram representing an example of a method for a node to publish a message on a particular topic in a shared memory message communication system that allows nodes to publish messages for other nodes to read that may be performed, for example, on the shared memory message communication system illustrated in FIG. 5.

FIG. 7 is an illustration of a flow diagram representing an example of a method for a node to publish a message on a particular topic in a shared memory message communication system that allows a node 705 to publish messages for other nodes to read that may be performed, for example, on the shared memory message communication system illustrated in FIG. 5. As described above, the node may be representative of a module 109 (FIG. 2) that performs a certain functionality in the computer system 105 of a vehicle. Accordingly, here and in other portions of this disclosure, references to a node 141 correspond to a module 109, and vice-versa, unless the context of the reference indicates otherwise.

At block 710, the node generates a message to publish. For example, an image collected from a sensor on the vehicle. At block 715, the node accesses the topic registry, via the communication bus, and reads information from the topic registry indicating which message bus to write the message to and where in the message bus the node should start writing the message. In instances where there is only one publisher node per topic, the message buffer may be already known, and where it left off writing messages in the message buffer may also be known, such that the pathname of where to write the message may be known in advance. In such cases, the publisher node topic registry may be accessed to update information about the message being published so subscriber nodes can access the new message. For example, at block 720, the publisher node determines where the message will end in the message buffer and this information may be updated into the topic registry at block 725. The publisher node at block 730 writes the message to the message buffer associated with the topic of the message it is publishing. Because these operations involve a node writing to a shared memory location instead of a communication of a message between two processes, accessing the topic registry to read and write information and accessing the message buffer to write the message does not need to go through the computer system kernel.

Figure 8:
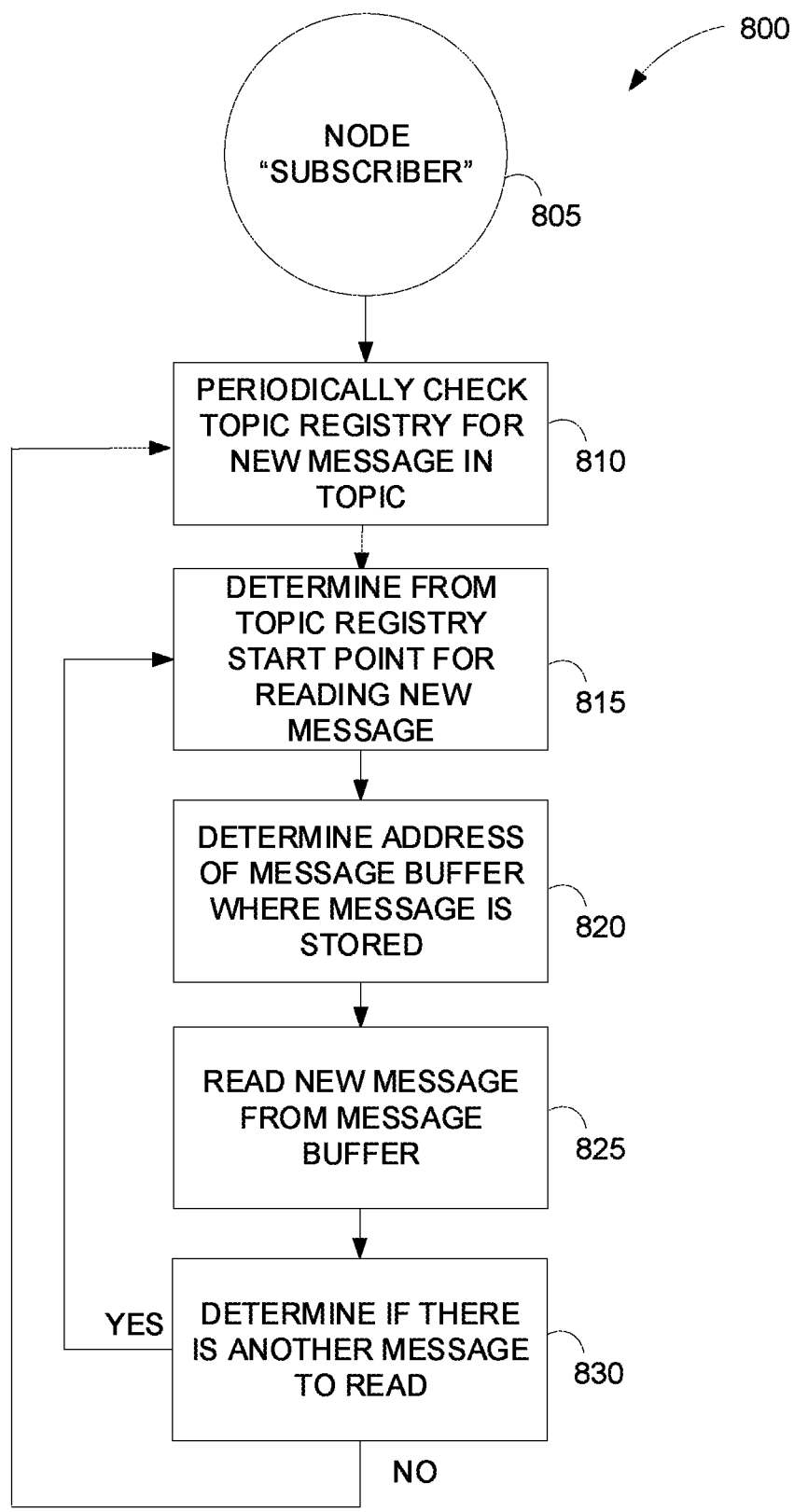
FIG. 8 is an illustration of a flow diagram representing an example of a method for a node to subscribe to (or read) a message on a particular topic in a shared memory message communication system that allows a node to subscribe to the messages published by one or more nodes that may be performed, for example, on the shared memory message communication system illustrated in FIG. 5.

FIG. 8 is an illustration of a flow diagram representing an example of a method for a node to subscribe to (or read) a message on a particular topic in a shared memory message communication system that allows a subscriber node 805 to subscribe to the messages published by one or more nodes that may be performed, for example, on the shared memory message communication system illustrated in FIG. 5. At block 810, the subscriber node 805 checks the topic registry for information indicating a new message for a topic has been published. In one embodiment, the topic registry will have a counter for each particular topic of messages that are published. Each subscriber node of the topic will also have a counter, which it uses to indicate how many messages of that topic it has read. By comparing the subscriber counter to the topic registry counter, the subscriber node can determine if a new message has been published (e.g., when the counter of the topic registry is higher than the counter of the subscriber node).

When a new message is available, at block 815 the subscriber node determines from the topic registry the starting point for reading the new message, and at block 820 the subscriber node determines the addresses of the message buffer where the message is stored (if needed). At block 825, the subscriber node uses the information provided by the topic registry to read the new message from message buffer. Because these operations involve a node reading from a shared memory location instead of a communication of a message between two processes, accessing the topic registry to read information and accessing the message buffer to read the message does not need to go through the computer system kernel. At block 830, the subscriber node determines that there is another message to read (for example, comparing a subscriber counter of the messages read by the subscriber node for a topic to a topic registry counter indicating the number of messages written for a topic. If a new message is available, the process reverts back to block 815 where the subscriber node determines the starting point for reading the new message. If it is determined that there is not another message to read at that time, the process 800 reverts back to block 810, where the subscriber node continues to periodically check to see if a new message relating to the topic it subscribes to has been published.

In various embodiments, a number of different processes may be implemented to read and write information to/from the topic registry, and to read and write messages to/from the message buffers. Below are examples of process operations that can be performed in some embodiments to set certain variables related to the topic registry, message buffers and the publisher/subscriber nodes. As a person of ordinary skill in the art will appreciate, there are many ways to name and define variables related to reading and writing information and messages to the topic registry and the message buffers, and the process operations below are merely examples and are not intended to limit features of any the embodiments described herein.

Initial State
tail_offset and pending_tail_offset initialized with values in existing shared memory file.
If shared memory file is created, both are initialized to zero.
For each reader: head_offset=tail_offset
Write Process
pending_tail_offset=std::max(tail_offset+msg_size, pending_tail_offset)
actual_size=WriteMessage(msg_bytes)
tail_offset+actual_size
Read Algorithm
if head_offset==tail_offset:
    // No new message written by e publisher.
    return EAGAIN
msg_size=ReadMessageSize(head_offset)
if pending_tail_offset>head_offset+body_size:
    //Memory we just read was overwritten by the publisher.
    // Reset head to a known safe location.
    head_offset=tail_offset
    return EAGAIN
msg_bytes=ReadMessageBytes(head_offset, msg_size)
if pending_tail_offset>head_offset+sizeof(msg_header)+shm_body_size:
    // Memory we just read was overwritten by the publisher.
    //Reset head to a known safe location.
    head_offset=tail_offset
    return EAGAIN
head_offset+=msg_size
return msg_size, msg_bytes FIGS. 7 and 8 describe an innovation of a method of communicating messages between a plurality of modules in a system on a vehicle, each module of the plurality of modules configured as a publisher node that writes messages, a subscriber node that reads messages, or both a publisher node and a subscriber node, the publisher nodes and the subscriber nodes collectively forming a plurality of nodes that communicate in the operation of the vehicle. An example of such a method includes generating a plurality of groups of messages by publisher nodes of the plurality of nodes. Each group of messages are associated with a single and unique topic, and are generated by a single publisher node associated with the unique topic. The publisher nodes each write their respective groups of messages in a memory location of a respective message buffer, that is, a message buffer that is associated with the same topic as the group of messages. Each of the message buffers are one of a plurality of message buffers that are configured to allow access to its memory by the publisher nodes and the subscriber nodes that are associated with the topic of the messages the message buffer stores, and there is one message buffer for each of the message topics.

A publisher node may store messages by writing in a registry (topic registry), for each message written in a message buffer, certain location information indicating where the message was written to (stored). The registry is configured to store location information associating each message written in a message buffer with, for example, an address of the message buffer, a memory location where each message written to a message buffer is stored, and a topic the stored message is associated with. The method includes reading, by subscriber nodes, new message information from the registry, the new message information indicative of whether a new message associated with a particular topic is available. Each of the subscriber nodes are configured to read one or more of the groups of messages (e.g., of the topics they are associated with). The subscriber nodes are also configured to determine, using the new message information read from the registry, if at least one new message associated with a topic that a respective subscriber node is also associated with is available. In response to determining at least one new message is available, each of the subscriber nodes that determined a new message was available for a topic they are associated with, read from the registry the location information indicating where the at least one new message is stored. The respective subscriber nodes also read the at least one new message from the respective message buffer.

Writing in the registry by a publisher node may include writing information in the registry indicative of a location (e.g., a memory address) in the message buffer where a message starts and a location (e.g., a memory address) in the message buffer where the message ends. A publisher node may also write in the registry information indicative of the location where the message ends before the writing of the message to the message buffer is completed, which may be referred to as a pending end (or tail) location of the stored message in the message buffer. A publisher node generating the message may determine the message size, and this may be used to write the pending location of the message to the registry. The size of the message may include the sum of the message payload or content (e.g., an image) and message padding. If the determined message size is greater than the message size allocated in the respective message buffer for storing messages, in some embodiments a publisher node may reallocate a bigger message storage size in the respective message buffer.

To determine if a new message is available for a publisher node to read, the registry may include, for each topic, a counter of new messages that are written to the respective message buffer. Each subscriber node may also have a counter related to each of the message topics it subscribes to. For a particular topic, the subscriber node may periodically check its read message counter for that topic with the new message counter for that topic at the registry. A new message is indicated when the new message counter at the registry is greater than the read message counter of the subscriber node. Other implementations are also possible where new message information on the registry indicates a new message is available for the subscriber to read. In some embodiments, the subscriber node is not notified that a new message is available (e.g., using above-described counters of the subscriber node and the registry). Rather, the subscriber nodes periodically checks to the new message information on the registry and uses the new message information to determine if a new message is available for reading. Different subscriber nodes may check for new messages at different periodicities, depending for example on a priority ranking of the messages, or on the known or publication rate of a message of a certain topic. In addition, other factors may affect how often a subscriber node checks for new messages. For example, the vehicle speed, the vehicle location, the operations a vehicle is undertaking (e.g., parking, driving in a congested city, driving on a country road), the number of other vehicles on the road, or information received from a source outside of the vehicle.

In various embodiments, the configuration of the communication system for the messaging operations of subscriber nodes and publisher nodes do not require utilizing the kernel of a main computer system, e.g., the kernel controlling the operations of the vehicle. Unlike systems that utilize the kernel to establish communication links between a message producer and a message receiver, using the described shared memory message system allows communications to occur that utilize less overhead as the communication operations between the publisher nodes, subscriber nodes, the registry, and the message buffer do not need or use another layer of overall communication management.

The techniques described herein may be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 9:
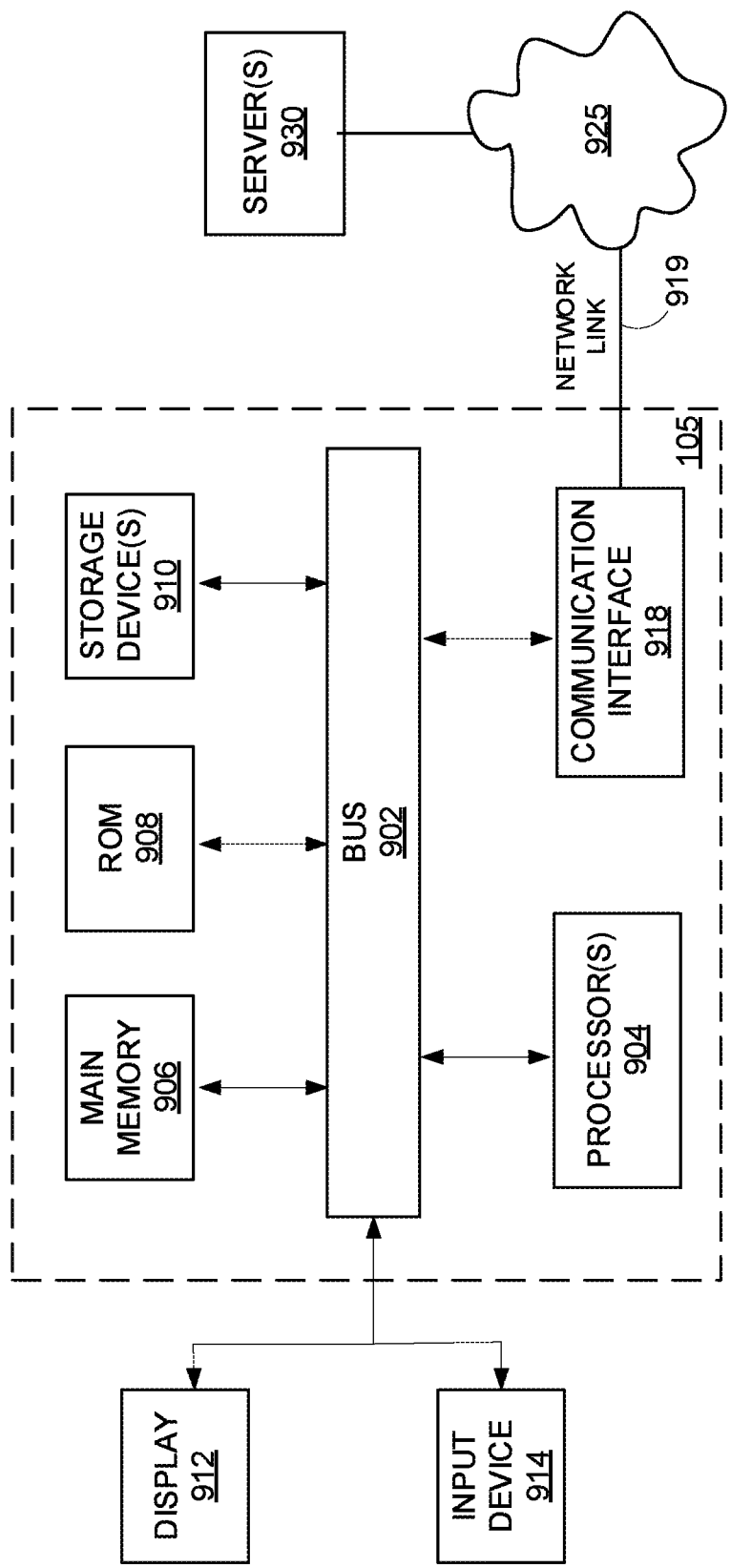
FIG. 9 is a schematic of an example of a computer system that can be on a vehicle and that can be used to perform the map data loading described herein.

FIG. 9 is a block diagram that illustrates a computer system 105 upon which any of the embodiments described herein may be implemented, for example, computer system 105 illustrated in FIG. 2. The system 105 may correspond identically to the system 105 described above, or have one or more different components. The computer system 105 includes a bus 902 or other communication mechanism for communicating information, and one or more hardware processors 904 coupled to the bus 902 for processing information. For example, the bus 902 may be the communication bus 505, 510, 115, 520 illustrated in FIG. 5. Hardware processor(s) 904 may be, for example, one or more general purpose microprocessors. The processor(s) 904 may correspond to a processor described above in reference to computer system 105.

The computer system 105 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 105 into a special-purpose machine that is customized to perform the operations specified in the instructions. In some embodiments, the instructions may cause a node 141 of the computer system 105 to generate a message to publish, access the topic registry and the message buffer corresponding to the topic of the message to determine where to store the message, right the message to the message buffer at the appropriate location, and update the topic registry indicating the message has been stored and where it starts. In some embodiments, the instructions may cause a node 141 of the computer system 105 to determine from the topic registry whether a new message is available to be read and the location of the message, read the new message from the message buffer, determine if there is another message to be read and if so read that message, and after determining there are no new messages waiting to be read, revert to a state with a node 141 periodically checks the topic registry for information indicating a new message to a topic it subscribes to has been published.

The computer system 105 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions. The main memory 906, the ROM 908, and/or the storage 910 may correspond to the memory 106 described above for storing map data. In some embodiments, the main memory 906 is the memory used to store the map data tiles when they are being used to control the vehicle 120. For example, one or more map data tiles may be initially stored on the storage device 910 and then, as needed based on the methods and systems described herein, the one or more map data tiles may be loaded into memory 906 and used to control the vehicle 120.

The computer system 105 may implement the techniques described herein using customized hard-wired logic, one or more ASICs or FPGAs, firmware and/or program logic which in combination with the computer system causes or programs computer system 105 to be a special-purpose machine. According to one embodiment, the techniques herein are performed by computer system 105 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The main memory 906, the ROM 908, and/or the storage 910 may include non-transitory storage media. The term "non-transitory media," and similar terms, as used herein refers to a media that store data and/or instructions that cause a machine to operate in a specific fashion, where the media excludes transitory signals. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 105 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

The computer system 105 can send messages and receive data, including program code, through the network(s) 925, network link 919 and communication interface 918. The networks(s) 925 maybe connected to one or more servers 930. In the Internet example, a server might transmit a requested code for an application program through the Internet, the ISP, the local network and the communication interface 918. The received code may be executed by processor 904 as it is received, and/or stored in storage device 910, or other non-volatile storage for later execution.

While the present disclosure is generally described herein with respect to a vehicle 120 operating in an autonomous mode, this is merely for illustrative purposes and is not meant to be limiting. Any of the techniques or operations described herein can apply to vehicles 120 that provide driver assist-features and/or that are used for ride-sharing or other location-based services.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm or model. In some embodiments, a machine learning algorithm or model may not explicitly program computers to perform a function, but can learn from training data to make a predictions model (a trained machine learning model) that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Headings are included herein for reference and to aid in locating various sections. These headings are not intended to limit the scope of the concepts described with respect thereto. Such concepts may have applicability throughout the entire specification.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The phrase "based on" does not mean "based only on," unless expressly specified otherwise. In other words, the phrase "based on" describes both "based only on" and "based at least on." Unless otherwise explicitly stated, articles such as "a" or "an" should generally be interpreted to include one or more described items. Accordingly, phrases such as "a device configured to" are intended to include one or more recited devices.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method of communicating messages between a plurality of modules in a system on a vehicle, each module of the plurality of modules implemented on at least one processor and configured as a publisher node that writes messages, a subscriber node that reads messages, or both a publisher node and a subscriber node, the publisher nodes and the subscriber nodes collectively forming a plurality of nodes that communicate in the operation of the vehicle, the method comprising:

generating a first message associated with a first topic by a first publisher node;

determining, by the first publisher node, a first offset in a first message buffer of a plurality of message buffers at which the first message will end when the first message is written to the first message buffer, wherein the first message buffer is stored in a first shared memory region of the system separate from the plurality of nodes and is accessible to the first publisher node and one or more of the subscriber nodes via a first communication bus;

updating, by the first publisher node via a second communication bus, a topic record associated with the first topic that is stored in a topic registry, the topic record updated to include the first offset to indicate an allocated space for the first message, wherein the topic registry is stored in a second shared memory region of the system separate from the plurality of nodes and is accessible to the plurality of nodes via the second communication bus, and wherein the topic record is configured to store location information indicating a communication address of the first message buffer and frequency information indicating a frequency at which the first publisher node publishes messages to the first message buffer;

writing, by the first publisher node via the first communication bus, the first message to a memory location in the first message buffer, the first message buffer associated with the first topic and configured to store a plurality of messages associated with the first topic, the other of the plurality of message buffers each associated with a unique message topic and configured to each store a plurality of messages related to its associated message topic, wherein the memory location where the first message is stored is a shared memory location accessible to subscriber nodes that are configured to read messages related to the first topic; and writing to the topic record, by the first publisher node via the second communication bus, a second offset in the first message buffer indicating where the written first message ends.

2. The method of claim 1, wherein the first communication bus is configured to communicate messages between the plurality of nodes and the plurality of message buffers.

3. The method of claim 2, wherein the first communication bus is further configured to communicate the location information between the registry and each of the plurality of nodes.

4. The method of claim 2, wherein writing the first message to a memory location in the first message buffer comprises directly writing the first message to the memory location in the first message buffer via the first communication bus.

5. The method of claim 4, wherein directly writing the first message to the memory location in the first message buffer comprises writing the first message to the memory location in the first message buffer without interaction in the communication by a kernel of the system.

6. The method of claim 2, wherein writing to the topic record a second offset in the first message buffer comprises directly writing to the topic record the second offset in the first message buffer via the second communication bus.

7. The method of claim 6, wherein directly writing to the topic record the second offset in the first message buffer comprises writing to the topic record the second offset in the first message buffer without interaction in the communication by a kernel of the system.

8. The method of claim 1, wherein each of the publisher nodes writes a plurality of messages that are each associated with a particular topic, and wherein the messages of the plurality of messages that are associated with the same topic are written by the same one of the publisher nodes.

9. The method of claim 1, further comprising:

generating a second message associated with the first topic by the first node;

writing, by the first publisher node via the first communication bus, the second message to a second memory location in the first message buffer; and modifying, by the first publisher node, the topic record to include a third offset in the first message buffer, in place of the second offset, that indicates where the written second message ends.

10. The method of claim 1, further comprising:

generating a second message associated with a second topic by a second node;

writing, by the second node via the first communication bus, the second message to a second memory location in a second message buffer of the plurality of buffers; and writing to a second topic record in the registry, by the second publisher node, a third offset in the second message buffer indicating where the written second message ends.

11. The method of claim 9, further comprising:

determining, by the first publisher node, a second memory location in the first message buffer next available to store the second message, wherein the plurality of nodes are configured such that the first publisher node is the only publisher node that writes to the first message buffer; and storing the second message in the first message buffer at a beginning of the second memory location.

12. The method of claim 1, wherein each of the plurality of message buffers are configured as ring buffers.

13. The method of claim 1, wherein the topic registry comprises data representative of the topic of each message buffer in the plurality of message buffers.

14. The method of claim 1, wherein the plurality of message buffers and the topic registry are implemented on one or more storage components of the system that are different components from the storage components implementing any of the plurality of modules.

15. The method of claim 1, wherein the topic registry is further configured to store location information of all the messages stored on the plurality of message buffers.

16. The method of claim 1, further comprising generating an alert in response to a determination that the first publisher node is not writing messages to the first message buffer at the frequency indicated by the frequency information.

17. The method of claim 1, wherein the plurality of modules comprises at least one of a vehicle position module, an optical sensor module, an infrared sensor module, a light detection and ranging (LiDAR) sensor module, a radio detection and ranging (RADAR) sensor module, a global position system (GPS) module, a user interface module, a map data-geographic module, a map data-geometry module, an inertia sensor module, a navigation module, an auto driving controller module, a vehicle system controller module, a communication interface module, or a car to car interface module.

* * * * *